United States Patent [19]

Angersbach et al.

[11] 4,228,385
[45] Oct. 14, 1980

[54] SPEED-REGULATED POSITIONING DRIVE

[75] Inventors: Wolfgang Angersbach, Darmstadt; Karl-Heinz Meier, Zeilhard, both of Fed. Rep. of Germany

[73] Assignee: Quick-Rotan Becker & Notz KG, Darmstadt, Fed. Rep. of Germany

[21] Appl. No.: 861,636

[22] Filed: Dec. 19, 1977

[30] Foreign Application Priority Data

Dec. 20, 1976 [DE] Fed. Rep. of Germany ....... 2657658

[51] Int. Cl.² ............................................... G05B 5/01
[52] U.S. Cl. ................................... 318/614; 318/611; 318/341; 318/603
[58] Field of Search .................. 318/11, 466, 467, 470, 318/341, 603, 396, 397, 398, 614, 561, 611; 310/76; 192/12 D, 18 B, 17 C, 103 R, 113 R, 104, 107 M, 70.19, 70.2

[56] References Cited

U.S. PATENT DOCUMENTS

| | | | |
|---|---|---|---|
| 3,240,301 | 3/1966 | Smith | 192/107 M |
| 3,599,764 | 8/1971 | Daab et al. | 192/12 D |
| 3,622,852 | 11/1971 | Myers | 318/341 |
| 3,637,053 | 1/1972 | Boyles | 192/70.19 |
| 3,721,882 | 3/1973 | Helms | 318/603 |
| 3,952,236 | 3/1976 | Hoover | 318/341 |
| 4,006,809 | 2/1977 | Seino et al. | 192/113 R |
| 4,011,490 | 3/1977 | Daab et al. | 318/467 |
| 4,013,933 | 3/1977 | Dohi et al. | 318/467 |

FOREIGN PATENT DOCUMENTS 2416238 11/1974 Fed. Rep. of Germany ............. 310/76

*Primary Examiner*—J. V. Truhe
*Assistant Examiner*—Eugene S. Indyk
*Attorney, Agent, or Firm*—Michael J. Striker

[57] ABSTRACT

The drive shaft of a motor can be coupled to an output shaft by an electromagnetically activated friction clutch. The output shaft can be braked by an electromagnetically activated friction brake. The motor drive shaft rotates at constant speed. The rotary speed of the output shaft is regulated by negative-feedback action to maintain a selected value, by activating the clutch and brake alternately as necessary. The activating signals for the clutch and brake are pulse-width-modulated activating signals. The output shaft can be stopped in at least one predetermined angular position when commanded to do so. The movable parts of the brake and clutch are of minimal mass, and the speed-regulating system includes a speed feedback transducer system of very high resolution.

21 Claims, 10 Drawing Figures

SPEED-REGULATED POSITIONING DRIVE

BACKGROUND OF THE INVENTION

The present invention relates to positioning drives of the type comprising an output shaft whose speed can be increased by activating an electromagnetically activated clutch which couples the shaft to the drive shaft of an electric motor, and whose speed can be decreased by activating an electromagnetically activated brake, and provided with a negative-feedback speed regulating system, as well as with a positioning system operable for causing the output shaft to stop in a commanded angular position.

Two principal requirements are placed upon positioning drives of the type in question. One is that the output shaft, when commanded to stop at a predetermined angular position, do so very quickly, i.e., the decrease of speed from current operating speed down to zero speed should be effected within the shortest possible time. The other is that when the output shaft is thusly stopped, it be stopped very exactly at the angular position desired. The realization of these two requirements is often very difficult to effect in practice, especially when the driven load fluctuates. Such problems arise, for example, when such positioning drives are used to drive sewing machines, winding machines, machine tools, and the like.

SUMMARY OF THE INVENTION

It is the general object of the invention to provide a positioning drive of novel design and operation, which achieves an optimal compromise between the speed at which the output shaft of the drive can be stopped and the precision with which it can be stopped at a predetermined angular position.

According to the present invention, this is accomplished by a combination of mechanical and structural features and circuit and circuit-operation features. In particular, it is a general concept of the invention to make the masses of the moving parts of the clutch and the brake of the drive minimal, to utilize in the speed-regulation system of the drive a speed feedback transducer of very high resolution (i.e., capable of distinguishing very small speed differences), and utilizing for the activation of the clutch and brake of the drive a negative-feedback system whose activating signals are pulse-width-modulated.

This combination of mechanical and circuit features leads to a positioning drive which inherently exhibits a very high degree of positioning control, defined as the reciprocal of the product of the time required to bring the output shaft to a standstill and the error in the angular position at which the output shaft is stopped.

Advantageously, the clutch-brake unit comprises axially shiftable clutch and brake disks, each comprising a combination of magnet pole pieces and a light-metal carrier plate. Due to the use of independently shiftable clutch and brake disks, when one switches over from braking action to coupling action, or vice versa, the disk which is to become operative need move only a very small distance to become operative. The combination of magnet pole pieces and light-metal carrier plate for the clutch disk and brake disk makes it possible to utilize friction layers of large surface area, while still keeping the mass of the clutch and brake disks very small.

To avoid the stresses and deformations which could result from the use of materials of differing thermal-expansion coefficients, the carrier plates of the clutch and/or brake disk can be provided with plural discrete magnet pole pieces, at the periphery of the respective carrier disk, cast onto the carrier disk.

For a given magnetic circuit structure, in order to develop the greatest possible pressing force (coupling or braking force), the friction layers on the clutch or brake disks preferably extend axially only a very small distance past the respective magnet pole pieces. Accordingly, the air gaps of the electromagnetically activated clutch and brake can be maintained very small.

Preferably the friction layers are made of cork, plus paraffin and/or organic or inorganic lubricant. Such friction layers have a surprisingly long useful lifetime. This is particularly the case when the structure of the drive is provided with cooling-air channels for the flow of cooling air around all sides of the clutch and brake disks, so that during operation the frictionally generated heat can be quickly removed from large surface areas.

In the preferred form of the invention, the clutch and brake disks are connected to the output shaft of the drive non-rotatable relative thereto, but axially shiftable relative thereto, and are so mounted that when they shift axially they do so with roller-bearing action. This concept combines the advantage of establishing the non-rotatable connection with the output shaft by spring means (disclosed in German published patent application No. 2,416,238) with the advantage of using wedge-shaped toothing (disclosed in German allowed patent application No. 1,613,350). On the one hand, the inventive expedient permits the clutch and brake disks to be axially shifted without any force resisting such shifting. On the other hand, the non-rotatable connection of the clutch and brake disks to the output shaft is free of play, and thereby avoids the operating noise and vibration of the disks relative to the output shaft which are associated with such play.

In one embodiment of the invention, the output shaft carries a guide body provided with angularly spaced axially extending openings containing roller-bearing connectors, alternate ones of which couple the output shaft to the brake disk and to the clutch disk, respectively. Each such roller-bearing connector comprises a guide sleeve connected to the respective one of the brake and clutch disks and a ball-bearing sleeve surrounding and concentric with the guide sleeve and provided with a plurality of freely rotatable spherical bearing elements.

In another embodiment of the invention, the outer periphery of the output shaft is provided with angularly spaced, axially extending, generally semi-cylindrical grooves, cooperating with corresponding grooves at the periphery of central openings in the carrier plates of the clutch and brake disks, with spherical bearing elements being confined in the spaces defined by pairs of such grooves.

In order to achieve a high-resolution indication of rotary speed and to make the construction of the speed-regulation system as simple and inexpensive as possible, the actual-RPM feedback transducer of the system is preferably comprised of a slitted or otherwise marked control disk and a cooperating light source and light detector. Such a system could also be used for the furnishing of the desired-RPM command value. For the control disk, it is preferred to use a metal disk, for example made of copper, on which slits are formed by etching. With such a disk, it is possible at relatively low cost to form, for example, three hundred angularly spaced etched slits, without exceeding the dimensions typical of conventional RPM measuring devices, such as simple tachometers. The resultant high-resolution of the control disk makes possible very accurate measurement of rotary speed.

In one embodiment of the invention, the desired-RPM command value generator is in infinite-resolution potentiometer having a definite zero-setting whose wiper is moved by footpedal control, and preferably a comparator is connected to the output of the potentiometer. Such a potentiometer affords an absolutely stepless selectability of desired RPM, at low structural cost. The use of one or more comparators makes it possible to trigger certain switching operations when certain footpedal positions are reached, without incurring the problems of wear which arise when use is made of conventional microswitches.

It is also contemplated to connect to the desired-RPM command potentiometer a further potentiometer or the like, to be able to vary the functional relationship between footpedal depression and commanded speed.

In a preferred embodiment of the invention, there is connected between the actual-RPM transducer and the negative-feedback speed control system a timing capacitor chargeable through a monostable circuit, the discharge time of the capacitor being automatically varied in dependence upon the desired-RPM command value. This circuit expedient, in combination with the features discussed above, makes it possible to achieve a considerably improved, load-independent negative-feedback regulation of rotary speed even at very low speeds, e.g., lower than 50 RPM. In order to avoid gaps in negative-feedback rotary-speed regulation during low-speed operation, the pulse train furnished by the speed feedback transducer of the system is passed through a frequency multiplier. A particularly simple embodiment for a frequency multiplier comprises a double monostable circuit, which is triggered to produce an output pulse both in response to the leading flank of an input pulse and also in response to the trailing flank of an input pulse, thereby constituting a frequency doubler.

To further increase the stopping precision of the drive, it is contemplated, during the stopping operation, to first lower the RPM of the output shaft from the current operating value down to a predetermined low shut-off value, by negative-feedback control, after which the output shaft is then stopped in a predetermined angular position. Preferably, the leading flank of a position-indicating pulse corresponding to this angular position triggers a changeover in the desired-speed command value from the current command value down to the lower shut-off value, and the lower shut-off value is then achieved by negative-feedback action before the predetermined angular position is actually reached; in particular, the trailing flank of the just-mentioned position-indicating pulse triggers the actual stopping of the output shaft.

In connection with this concept of establishing by negative-feedback action a reduced shut-off RPM just prior to arresting the output shaft, this need not be done by a simple changeover of the desired-speed command value. Instead, it is alternatively contemplated to use an auxiliary desired-speed command value after stopping of the output shaft has been commanded. The auxiliary desired-speed command value is a function of the angular position of the shaft; the closer the shaft is to the predetermined angular position at the time stopping is commanded, the lower will be the auxiliary desired-speed command value. This concept can for example be implemented using a counter which counts the pulses of the pulse train generated by the RPM feedback transducer of the system, with a digital-to-analog converter converting this count into a staircase voltage utilized as the auxiliary desired-speed command value. The value of the staircase voltage decreases as the pretermined angular position is neared, down to a lowest value corresponding to the afore-mentioned shut-off speed. Thus, if stopping at a predetermined angular position is commanded just after the shaft has passed through that position, a maximum time interval remains before the shaft can anyway reach that position again, and the deceleration of the shaft need not be as intense as otherwise. Also, in addition to the avoidance of unnecessarily intense deceleration, the time elapsing between a command that the shaft be arrested in a particular angular postion and the next reaching of that angular position will not be unnecessarily long. In effect, therefore, the shaft is stopped at the desired angular position sooner, although the rate at which the shaft speed is reduced to the shut-off value is decreased.

The control circuitry contemplated by the invention is particularly suited for realization using MOS circuit blocks, for example capable of operation with supply voltages of $+5$ V and $-6$ V. This makes for a simple connection of linear amplifiers, comparators and power-amplifier stages.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
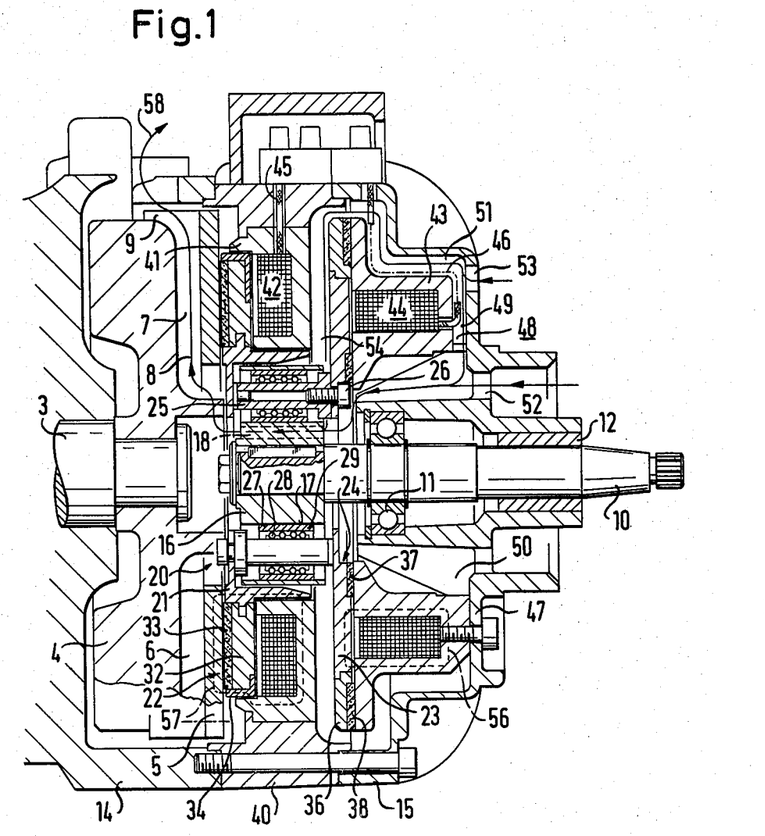
FIG. 1 is a longitudinal section through the clutch and brake unit of a positioning drive embodying the invention.

FIG. 1 schematically depicts the end of the drive shaft 3 of an electric motor, typically a three-phase or one-phase A.C. motor. During operation, the drive shaft 3 rotates uninterruptedly with a constant speed of e.g., 3000 RPM. Mounted on motor shaft 3 is a flywheel 4, preferably made of cast iron. Fixedly secured on flywheel 4, preferably by means of bolts, is a ring 5 made of magnetically conductive material. In particular, ring 5 is supported upon ribs or spokes 6 of the flywheel 4, leaving air slots 7 through which a flow of cooling air 8 can pass. The radially outer ends of the ribs or spokes 6 are configured to form a ring of fan blades 9, operative for sucking in the flow of cooling air 8.

Figure 2:
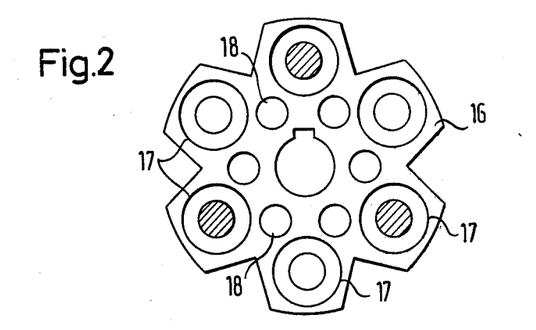
FIG. 2 is an end view of the guide body in the structure of FIG. 1.

Coaxial with the motor shaft 3 is an output shaft 10, mounted by a ball bearing 11 and a sleeve bearing 12. The latter bearings are mounted on a bearing structure 15 which is bolted onto the motor housing 14. Wedged on to the left end of output shaft 10 is a guide body 16. As shown in FIG. 2, guide body 16 has six circumferentially spaced, axially extending openings 17 and an equal number of axially extending cooling-air through-bores 18. The cooling-air through-bores 18 are located radially inward of the openings 17 and occupy angular positions intermediate neighboring openings 17. Located in the openings 17 are roller-bearing connectors 20, alternate ones of which are secured to the hub body 21 of a clutch disk 22 and to the hub body 23 of a brake disk 24, respectively. The hub bodies 21, 23 are made of magnetically conductive material. Each roller-bearing connector 20 comprises a guide sleeve 25, mounted by means of a screw 26 on the clutch disk or brake disk as the case may be, and a ball-bearing holding sleeve 27 concentric with the respective guide sleeve 25. Each ball-bearing holding sleeve 27 positions a plurality of freely turnable ball bearings 28. The ball bearings 28 are distributed both axially and circumferentially of each guide sleeve 25. The ball bearings 28 contact the outer peripheral surface of the respective guide sleeve 25 and the inner peripheral surface of a respective bearing bushing 29, force fitted into the respective one of the openings 17. In this way, the roller-bearing connectors make for a non-rotatable connection of the clutch disk 22 and brake disk 24 with the output shaft 10, while simultaneously permitting a limited movement of the clutch disk and brake disk relative to the output shaft in the axial direction.

The hub body 21 of the clutch disk 22 is surrounded by a light-metal carrier plate 32, the latter being provided, on the side thereof facing the ring 5, with a friction layer 33. The peripheral surface of the carrier plate 32 is encircled by four magnetically conductive pole pieces 34, shown individually in FIG. 3.

Figure 3:
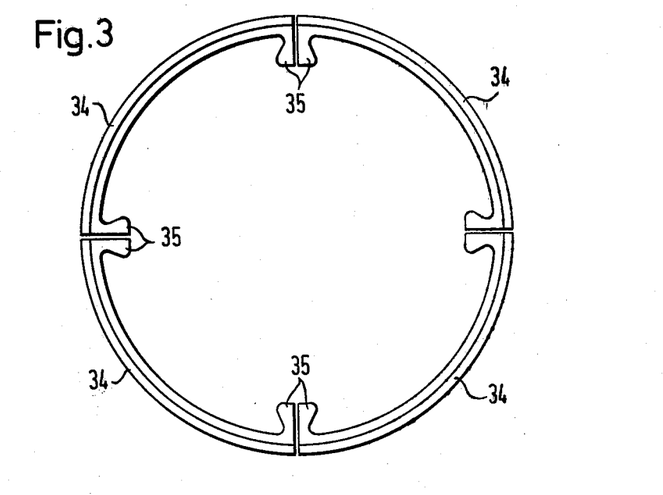
FIG. 3 is an end view showing the pole pieces for the clutch disk, before these are cast onto the light-metal carrier plate of the clutch disk.

The clutch disk 22 is preferably formed by inserting the hub body 21 and the pole pieces 34, the latter provided with holding noses 35, into a cast iron mold, and then pouring in the metal which is to form the carrier plate 32, for example aluminum. The use of a plurality of discrete pole pieces 34 tends to avoid those mechanical stresses which would otherwise develop, due to the differing thermal-expansion coefficients of the material of the carrier plate 32 and the pole pieces 34, if a one-piece pole ring were utilized instead of the discrete pole pieces 34.

The hub body 23 of the brake disk 24 is surrounded by a light-metal carrier plate 36. The sides of the hub body 23 and of the carrier plate 36 which face away from the clutch disk 22 are provided with respective friction layers 37 and 38, the latter being annular, concentric and located in a common radially extending plane.

Between the motor housing 14 and the bearing structure 15 is mounted a housing part 40 in which is shrink-fitted a magnet housing 41 for a clutch coil 42. The clutch coil 42 is annular and of generally rectangular cross section, and its radial dimension is greater than its axial dimension. The magnet housing 43 for a brake coil 44 is connected to the bearing structure 15, for example by mounting bolts. The brake coil 44 is likewise a cylindrical coil, but its larger dimension is its axial dimension. The electrical leads for the clutch and brake coils are indicated at 45 and 46.

The magnet housing 43 bears against the end wall 47 of the bearing structure 15 via ribs 48, which leave between the magnet housing and the bearing structure a plurality of radial cooling-air channels 49. Additional cooling-air channels 50 and 51 are located radially inward and radially outward of the magnet housing 43, respectively. These channels communicate with a group of cooling-air openings 52, 53 in the end wall 47. A further cooling-air channel 54 is located between the magnet housing 41 and the end face of the brake disk 24 which faces away from magnet housing 41. Cooling-air channel 54 communicates both with the cooling-air channels 50, 51 and also with the through-bores 18, which in turn serve to establish communication with the air slots 7.

The part of the structure thus far described operates as follows:

In the starting condition, the friction layers 33, 37 and 38 are axially spaced by small distances from the respective ones of the ring 5 of the flywheel 4 and the stationary magnet housing 43 of the brake magnet. The motor shaft 3 and the flywheel 4 rotate. The output shaft 10 stands still. If clutch coil 42 is now energized, there develops a magnetic force field 57, whose lines of force attempt to cause the air gap between the ring 5 and the hub body 21 as well as the pole pieces 34 to become smaller. As a result, the clutch disk with its friction layer 33 is pressed against the rotating flywheel ring 5. Clutch disk 22, which is non-rotatably connected to the output shaft 10 by the roller-bearing connectors 20, shares the rotation of flywheel 4 and turns output shaft 10.

If brake coil 44 is now energized, there develops a magnetic force field 56, which causes the brake disk 24 to be pressed with friction layers 37, 38 against the magnet housing 43, the latter providing a braking surface. The output shaft 10 is braked.

The uninterruptedly rotating flywheel 4 sucks cooling air in through the openings 52, 53; this cooling air circulates about all sides of the heat-generating constituent parts of the clutch and brake units, i.e., the clutch and brake coils as well as the friction layers and cooperating countersurfaces. Ultimately, the cooling air 8 leaves the motor housing through corresponding (non-illustrated) openings, the air in so leaving being guided around as indicated at 58, so as to sweep over the outsides of the clutch and brake units as well.

Figure 4:
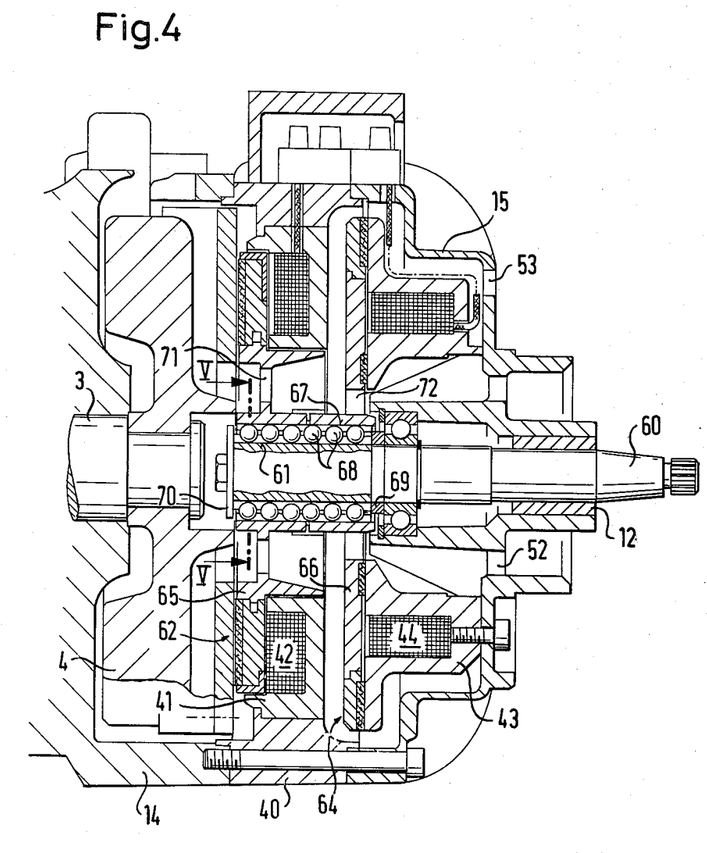
FIG. 4 is a longitudinal section similar to FIG. 1, but of another embodiment of the invention.
Figure 5:
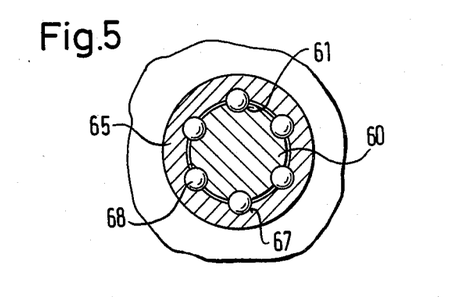
FIG. 5 is a section taken along line V—V of FIG. 4.

The embodiment of the clutch-brake unit depicted in FIGS. 4 and 5 differs from the one just described, only with respect to the connections between the clutch and brake disks, on the one hand, and the output shaft, on the other hand. In this embodiment, the end of output shaft 60 facing flywheel 4 is provided with a series of circumferentially successive axially extending grooves 61, of generally semicylindrical shape. The clutch disk 62 and the brake disk 64 are provided with respective hub bodies 65, 66 having central openings configured to receive the grooved end section of output shaft 60. The peripheral surfaces of these central openings have grooves 67 of substantially the same shape as the grooves 61 and positioned by the latter. The spaces formed by the two groups of grooves 61, 67 each contain a plurality of freely rotatable bearing balls 68, which are prevented from rolling out of the grooves 61, 67 by means of a spacer ring 69 and an end plate 70. Accordingly, the clutch and brake disks are axially shiftable but non-rotatable relative to the output shaft 60. Cooling-air openings 71, 72 in the hub bodies 65, 66 provide for the travel of cooling air through the structure, in the same manner as in the embodiment of FIGS. 1–3.

Figure 6:
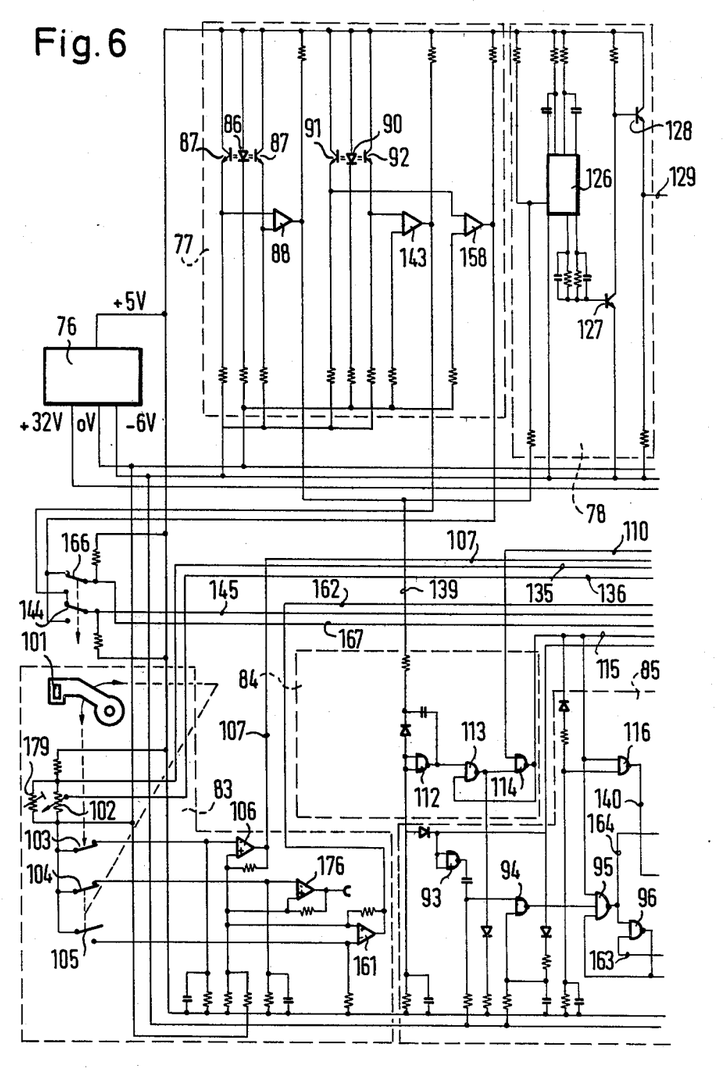
FIGS. 6 and 7 are the left and right halves of a circuit diagram depicting an exemplary control circuit for the structures shown in FIGS. 1—5.
Figure 7:
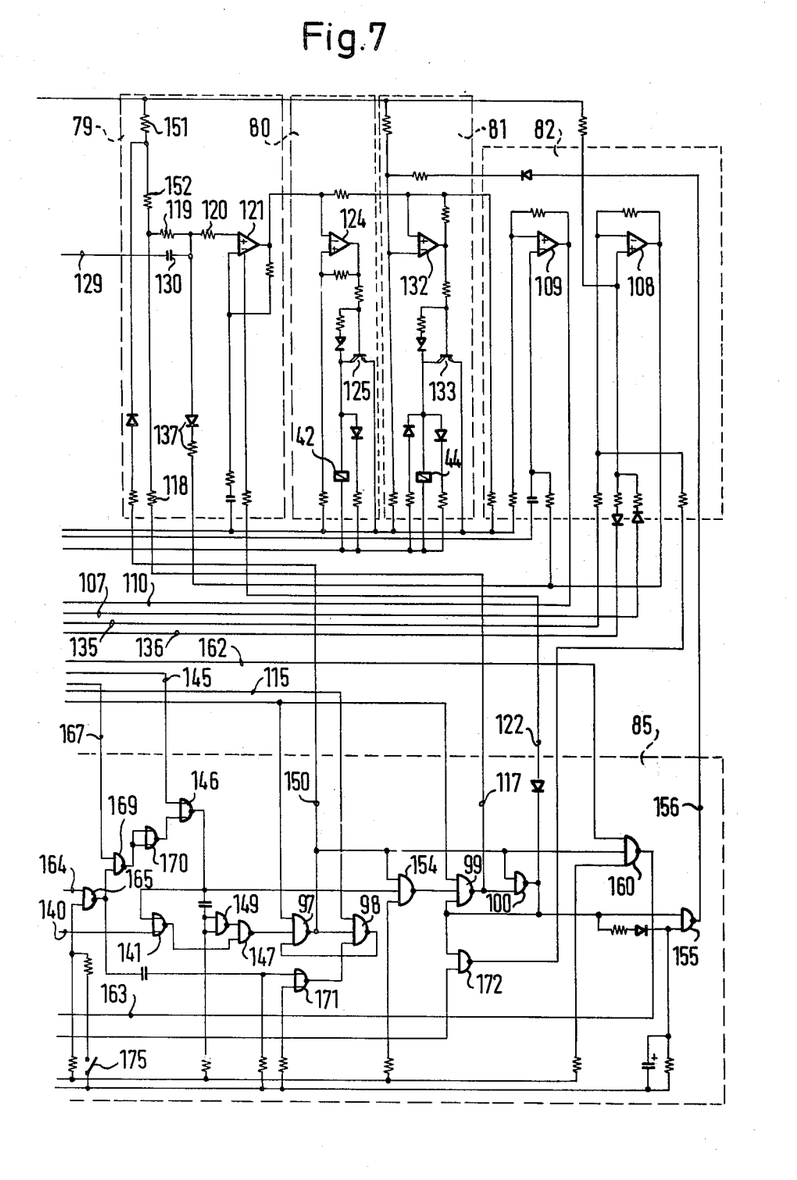

FIGS. 6 and 7 depict the left and right halves of a control circuit operative for controlling the clutch and brake units in either the embodiment of FIGS. 1–3 or that of FIGS. 4 and 5. Mainly, the control circuit comprises a power supply 76, an angular-position indicator 77, a frequency-doubling stage 78, a servo amplifier 79, a clutch power amplifier 80, a brake power amplifier 81, a desired-value amplifier 82, a desired-rotary-speed transducer stage 83, an actual-rotary-speed transducer stage 84, and a logic circuit 85.

Figure 9:
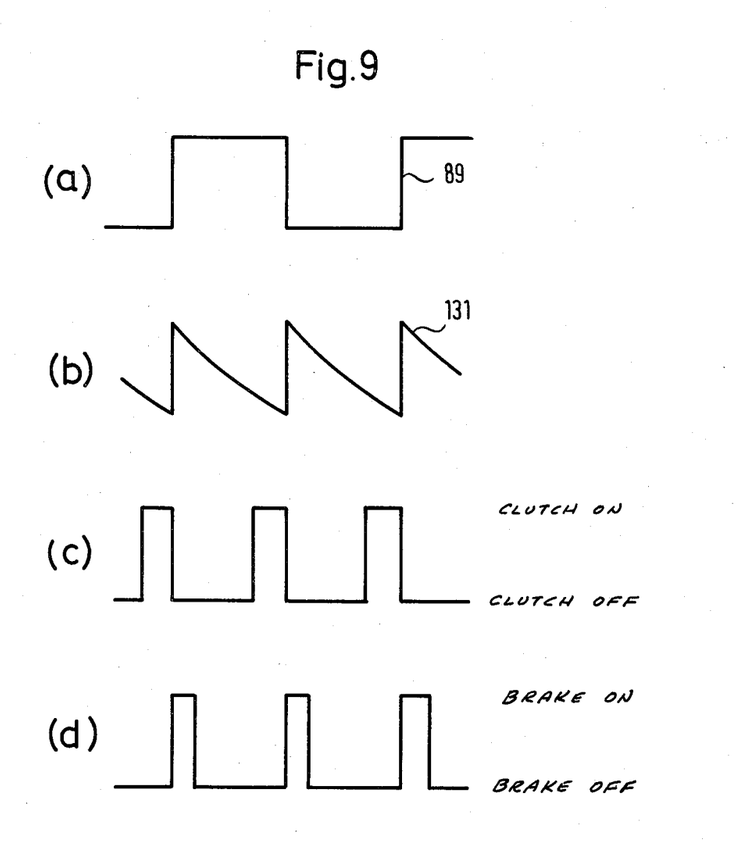
FIG. 9 depicts certain of these signals on an expanded time scale, for easier visualization.

The angular-position indicator 77 of the illustrated embodiment can be designed in accordance with German published patent application No. 2,416,113 or corresponding U.S. Pat. No. 3,995,156. It includes a light source 86 and two cooperating light detectors 87. In the beam path between the source 86 and the detectors 87 there rotates a control disk provided with a circumferential succession of alternate light and dark zones. The control disk is mounted on the shaft to be driven, in the case of a sewing machine the armshaft of the sewing machine, which in turn would be driven by the output shaft 10 or 60. If the shaft in question turns, there appears at the output of an operational amplifier 88 a train of pulses 89 (FIG. 9a) whose repetition frequency is proportional to the rotary speed of the driven shaft.

The angular-position indicator 77 additionally includes a second light source 90 and two cooperating light detectors 91, 92. A control disk, likewise coupled with the shaft to be driven, has a first track in the beam path of detector 91 and a second track in the beam path of detector 92. The first track has a light-dark transition, e.g., in the form of a narrow light zone within an otherwise dark circular track, at one location corresponding to a predetermined angular position of the shaft to be driven. The second track has a corresponding light-dark discontinuity at a location corresponding to a second predetermined angular position of the shaft to be driven. In a sewing machine, where the shaft to be driven is the armshaft, which may for example be coupled to the output shaft 10 or 60 by means of a belt transmission, the two angular positions in question would correspond to the highest and lowest needle positions.

The clutch coil 42 is connected in the output circuit of the clutch power amplifier 80, whereas the brake coil 44 is connected in the output circuit of the brake power amplifier 81.

The operation of the control circuit is as follows:

After the power supply 76 is switched on, bistable circuits formed by gates 95, 96; 97, 98; and 99, 100 are set to their starting settings via gates 93, 94 of the logic circuit 85. A desired-rotary-speed command lever 101, preferably footpedal-activated, shifts the wiper of an infinite-resolution potentiometer 102. Lever 101 is furthermore mechanically coupled to a set of switches 103, 104, 105 in such a manner that switch 103 opens when the footpedal has been depressed to a very small initial extent. This causes an operational-amplifier comparator 106 to change from its positive to its negative state. As a result, via a line 107, the operational amplifier 108 of a desired-value amplifier 82 is enabled. If the desired-value command lever 101 is moved a further distance in the forward direction, a further operational-amplifier comparator 109 of the desired-value amplifier 82 changes from its negative to its positive state. The output signal of operational amplifier 109 is transmitted via a line 110 to an RPM-measuring stage 84 comprising gates 112, 113, 114. As a result, the output of gate 114 changes over from +5 V to −6 V. This output signal of gate 114 is transmitted via line 115 to inputs of gates 95, 98 and 116. As a result, the bistable stages 97, 98 and 99, 100 convert to their second states.

Figure 8:
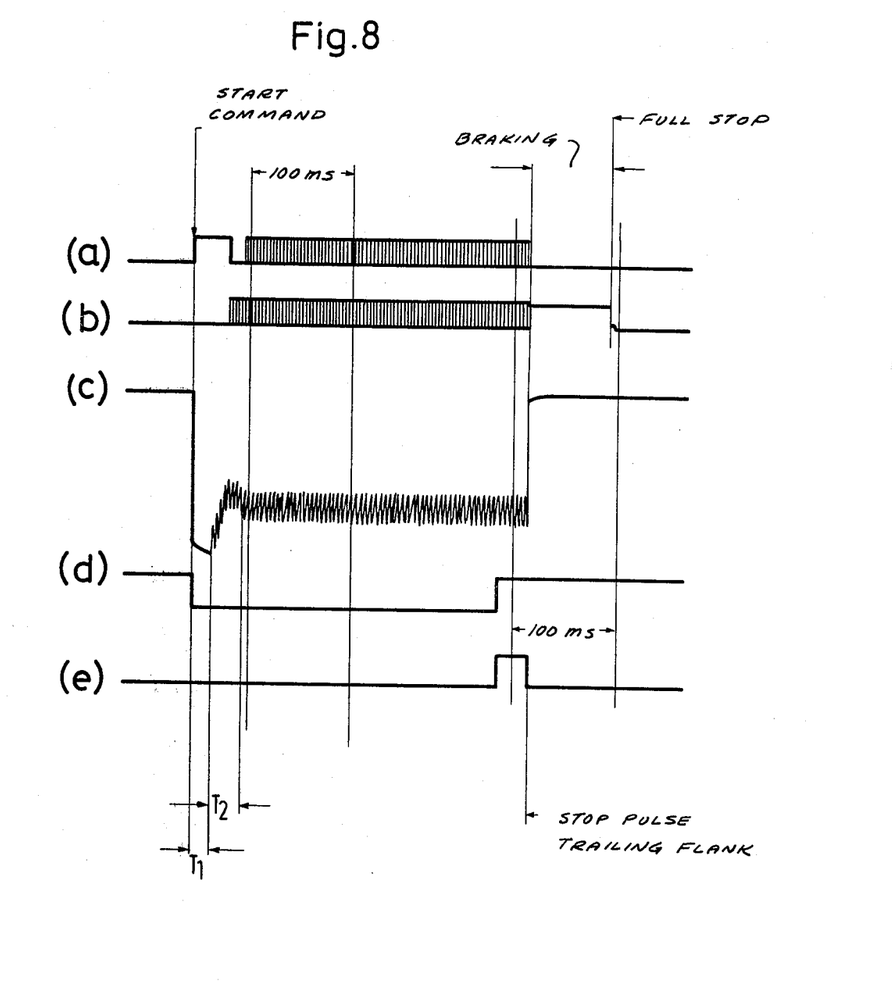
FIG. 8 depicts various signals generated during operation of the circuit depicted in FIGS. 6 and 7.

As indicated in FIG. 8d, there is now present at the output of gate 99 a signal of −6 V, which, via a line 117 and a resistor network comprising resistors 118, 119, 120, is transmitted to the non-inverting input of an operational amplifier 121, the latter forming part of the servo amplifier 79. Simultaneously, the output signal of gate 100 is transmitted via a line 122 to the strobe input of operational amplifier 121, enabling the servo amplifier for operation. Due to the now negative voltage applied to the inverting input of operational amplifier 121, the output signal of this amplifier, depicted in FIG. 8c, likewise assumes negative potential. This signal is transmitted to the inverting input of an operational amplifier 124 belonging to the clutch power amplifier 80, and the output signal of amplifier 24, as shown in FIG. 8a, converts to its positive value. As a result, the end-stage amplifying transistor 125 is rendered conductive. The clutch coil 42 becomes energized. Clutch disk 22 is pressed against the ring 5 on the constantly rotating flywheel 4. The outut shaft 10 or 60 begins to turn and begins to turn the armshaft of the sewing machine, for example through a belt drive.

The control disk in the beam path between the source 86 and the detector 87 of the angular-position indicator 77 rotates synchronously with the driven shaft. At the output of operational amplifier 88 appear actual-RPM signals in the form of pulses, for example having high and low values of +5 V and −6 V, and an ON-OFF ration of 1:1, generated at a rate of 240 per rotation of the driven shaft. These pulses are transmitted to the input of a doubly-triggered monostable circuit 126 forming part of frequency-doubling stage 78. Doubly-triggered monostable circuit 126 may, for example, comprise two monostable multivibrators, one triggered by the positive flanks of the output pulses from operational amplifier 88, the other triggered by the negative flanks. Each of these two flanks triggers at the input of a transistor 127 a pulse of constant pulse duration, for example 500 ns. Accordingly, there appear in the collector circuit of transistor 127, per armshaft rotation, 480 pulses, for the control disk assumed above. The frequency-doubling stage 78 additionally includes an impedance-converter transistor 128.

Let it be assumed that the shaft to be driven begins to turn subsequent to clutch energization, after the elapse of the clutch's electromechanical time constant $T_1$ (FIG. 8), amounting to e.g., 20 ms; there then appears at the emitter of transistor 128 the first of the constant-duration pulses, whose high and low values are +5 V and −6 V. Via a line 129, a capacitor 130, connected between the emitter of transistor 128 and the non-inverting input of operational amplifier 121, begins to charge in a sense to reverse the polarity of its voltage. There is produced at the output of operational amplifier 121 a sawtooth voltage 131 as shown in FIG. 9b, although there on a greatly expanded time scale. Due to the effect of the quickly rising RPM of the driven shaft, the middle value of the sawtooth voltage formed at capacitor 130 shifts towards the positive operating voltage, as shown in FIG. 8c. From the output of operation amplifier 121, positive potential is transmitted to the non-inverting input of an operational amplifier 132, which forms part of the brake power amplifier 81; the output signal of operational amplifier 132 is shown in FIG. 8b, and on an expanded time scale in FIG. 9d. The operational amplifier 132 renders end amplifier transistor 133 alternately conductive and non-conductive, in dependence upon the sawtooth voltage 131. When transistor 133 is conductive, brake coil 44 is energized by current. The brake disk 24 is pressed against the stationary magnet housing 43. In this way, the RPM of the driven shaft is varied, by negative-feedback action, to establish the desired RPM set on potentiometer 102, until the middle value of the sawtooth voltage reaches the zero voltage level. Accordingly, the dynamic phase of operation $T_2$ (FIG. 8) culminating in achievement of the desired steady state is finished.

As shown in FIGS. 9c and 9d, when the desired rotary speed has been achieved and is being maintained, the clutch system is alternately energized and unenergized, the brake system is alternately energized and unenergized, and the energization of the clutch and brake systems is performed alternately and with a phase shift, i.e., when the sawtooth voltage at the inverting input of operational amplifier 124 becomes more negative than a predetermined negative reference value, e.g., $-300$ mV and the sawtooth voltage at the non-inverting input of operational amplifier 132 becomes more positive than a predetermined positive reference value, e.g., $+500$ mV.

If the desired value for rotary speed is changed to a higher value by means of potentiometer 102, then signals are transmitted to operational amplifier 108 via lines 135, 136 such that negative potential develops at the output of this operational amplifier. This signal is transmitted via a resistor-diode branch 137 to the junction between capacitor 130 and resistor 120. As a result, the discharge time constant for the capacitor 130 is changed; the ON-OFF ratio for the clutch undergoes a corresponding change. The interpulse durations, in particular, are shortened. The resultant increase in the average value of the current for clutch coil 42 makes for a rapid increase of rotary speed. The negative-feedback-controlled increase of speed can proceed up to the point where the operational amplifier 121 goes into saturation and the clutch becomes uninterruptedly energized.

The negative-feedback-controlled decrease of speed proceeds analogously, although in the opposite sense. If the desired value of rotary speed is changed to a lower value, the voltage at the non-inverting input of operational amplifier 121 increases. The brake coil 44 is energized to keep the brake operative until such time as the middle value of the sawtooth voltage has returned to the value 0 V.

If the driven shaft is to be arrested in a predetermined angular position, the command lever 101 is moved to its 0-setting. Switch 103 closes. The output of operational amplifier 106 goes fully positive. Via line 107, operational amplifier 108 becomes blocked. Operational amplifier 109 likewise goes to its positive limit. The RPM measuring stage 84, connected via a line 139 to the output of operational amplifier 88, detects when the actual rotary speed has reached a predetermined low value, e.g., 180 RPM. The output voltage of gate 114 then jumps from $-6$ V to $+5$ V. After the elapse of a predetermined time delay, e.g., 10 ms, the output of gate 116 goes from $+5$ V to $-6$ V. This signal is transmitted via a line 140 to the input of a gate 141. As soon as the driven shaft has reached a predetermined angular position (first position), the operational amplifier 143 connected to the output of light detector 92 produces at its output a signal (FIG. 8e), which is then transmitted via a changeover switch 144, a line 145 and a gate 146 to the other input of gate 141. In response to the leading flank of the position signal, the output of gate 141 accordingly jumps from $-6$ V to $+5$ V. This output signal is transmitted to one input of a gate 147. As an additional response to the leading flank of the position signal, there is transmitted from the output of gate 146 via a gate 149 an enablement signal in the form of a pulse whose leading flank is constituted by a transition from $-6$ V to $+5$ V and having a predetermined duration, e.g., 200 ms. This enablement signal is transmitted to the second input of gate 147. Accordingly, the output of gate 147, connected to one input of gate 97, goes from $+5$ V to $-6$ V for a 200 ms time interval. As a result, the flip-flop constituted by gates 97, 98 assumes its first stable state. If the optionally provided connecting line 150 between the output of gate 97 and the junction between the two resistors 151, 52 in the input circuit of operational amplifier 121 is omitted, the output shaft continues to turn at the predetermined shut-off RPM of e.g., 180 RPM, until the trailing flank of the position signal for the first position appears (FIG. 8e). Then a signal is transmitted from the output of gate 97 to one input of a gate 154, and from the output of gate 146 to a further input of gate 154. The signal at the output of gate 154 returns the flip-flop constituted by gates 99, 100 to its first stable state. The signal transmitted from the output of gate 99 (FIG. 8d) via line 117 to the non-inverting input of operational amplifier 121, causes the output of the latter to be pulled to positive potential. As a result, the operational amplifier 124 causes the clutch to be shut off (FIG. 8a), whereas via the operational amplifier 132 the brake coil 44 becomes fully energized (FIG. 8b). The signal of gate 100, via the line 122 and the strobe input of operational amplifier 121, causes the output of the latter to be driven fully positive. The driven shaft is quickly braked to a standstill.

The potential change from $+5$ V to $-6$ V at the output of gate 100 causes the output of a gate 155, after a predetermined time delay such as 80 ms, to change over from $-6$ V to $+5$ V. The output of gate 155 is connected via a line 156 to the inverting input of the operational amplifier 132, so that the output of the latter upon elapse of this time delay jumps over to its fully negative value. Accordingly, the brake is now likewise again in unenergized condition (FIG. 8b).

In order to further increase the stopping precision of the system, the circuit shown in FIGS. 6 and 7 exhibits a further feature. Upon the resetting of the desired-RPM command lever 101 to its 0-setting, there first occurs an RPM drop from the current operating speed down to a predetermined shut-off speed, e.g., 180 RPM as mentioned above, and this lowered speed is maintained by negative-feedback action until the leading flank of the position signal at the output of operational amplifier 143 appears. At that time, the leading flank of the position signal causes, via the gate 97 and the connecting line 150, an automatic changeover of the desired-RPM value for the system to a second, still lower shut-off speed of e.g., 60 RPM. The RPM is brought down to this still lower shut-off speed, by negative-feedback action, within the time interval between the just-mentioned leading flank of the position pulse and the trailing flank thereof, and this still lower shut-off speed is maintained by negative-feedback action until the actual occurrence of the trailing flank, whereupon the drive shaft is brought to a standstill.

The cooperation between the light source 90 and the light detector 91 and its associated operational amplifier 158 makes possible the detection of, and the stopping of the driven shaft at, a second predetermined angular position. For the purpose of explanation, assume that the desired-RPM command lever 101 has been moved in forward direction to its top-speed position, determined by a mechanical stop, so that the driven shaft turns at maximum RPM. To achieve the second predetermined angular position, the desired-RPM command lever 101 is pulled back, past its 0-setting until it reaches it other end stop. As a result, switch 105 closes. Firstly, the driven shaft is braked down to the shut-off RPM in the manner already described, this being detected by the RPM measuring stage 84. When in this way gate 114 becomes enabled, then upon appearance of the leading flank of the first-position position signal at the output of operational amplifier 143 the flip-flop constituted by the gates 97, 98 returns to its first stable state. Accordingly, the middle input of a gate 160 is enabled. Gate 160 is also enabled at its upper input via the switch 105, an operational amplifier 161 and a line 162. Consequently, the output of gate 160 jumps from +5 V to −6 V. Via a line 163, the flip-flop constituted by the gates 95, 96 assumes its second stable state. A signal is transmitted from the output of gate 95 via a line 164 to a gate 165, thereby enabling transmission of the second-position position signal produced at the output of operational amplifier 158 and transmitted via a switch 166 and a line 167. The position signal is transmitted via gates 169, 170 to the gate 146.

After the first flank of the first position signal was detected, there was transmitted from flip-flop 95, 96 via gate 165 and a further gate 171 a start signal to the flip-flop constituted by gates 97, 98, as a result of which the driven shaft continues to turn at the predetermined shut-off speed until the second angular position is reached. The actual arresting operation for the second angular position thereupon proceeds in the manner already described with respect to the arresting of the driven shaft in the first predetermined angular position. By means of a gate 172, the effectiveness of the desired-RPM selection is blocked, during the travel of the driven shaft from the first to the second angular position.

A touch switch 175 creates the possibility of deciding, after the first angular position has been reached, whether the driven shaft should be turned to and then stopped at its second angular position or, alternatively, perform a single complete rotation and then again stop at its first predetermined angular position. A switch 104 and an operational-amplifier comparator 176 can be utilized to trigger the performance of auxiliary functions, e.g., depending upon the type of device being driven.

The relationship between the wiper-position of potentiometer 102 and the different angular positions of desired-value command lever 101 (or equivalently the angular positions of a footpedal coupled thereto), and the relationship between the wiper-position and resistance value of potentiometer 102, establish a predetermined functional relationship between command-lever position and the command desired-speed value. Under certain circumstances, it may be desired to alter this functional relationship, e.g., for the performance of special jobs. In the case of a sewing machine, it may for example be desired, for certain work, that the first half of the angular range of footpedal depression correspond to a low range of speed to permit fine control of low-speed selection, and that the remaining half of the angular range of footpedal depression correspond linearly to further speed increases up to top speed; this is just one example. To this end, a trimming resistor 179 is connected in parallel to potentiometer 102. It will be understood that, instead of a trimming resistor, use could be made of a more complex resistor or resistor-diode network comprised of a plurality of series- and/or parallel-connected elements. The potentiometer 102 and trimming resistor 179 can be so designed that, when their movable adjusting components are varied in setting linearly, the resultant effect upon the desired-value to be commanded is linear, quadratic, logarithmic, or the like.

Figure 10:
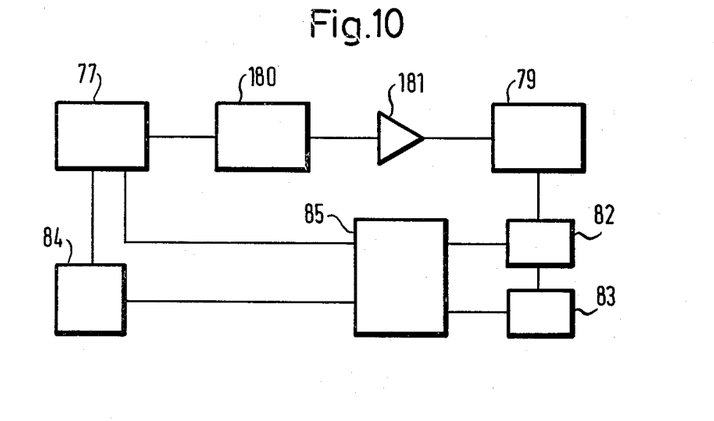
FIG. 10 is a simplified block circuit diagram of an alternative embodiment of the speed-control and positioning circuitry.

In the system depicted in FIGS. 6 and 7, when the driven shaft is to be stopped and the desired-value command lever 101 is for that purpose moved back to its 0-setting, the driven shaft is braked rather abruptly from its current operating speed down to 180 RPM. FIG. 10 depicts an alternative approach, according to which this decrease from current operating speed down to the 180 RPM shut-off speed is performed in a preprogrammed manner. To this end, the circuit depicted in FIG. 10 includes a counter 180 and, connected to the output thereof, a digital-to-analog converter 181. The input of counter 180 is connected to the angular-position indicator 77. Counter 180 counts the train of pulses which unit 77 furnishes for actual-RPM indication and resets in response to a position signal indicative of the predetermined angular position at which the driven shaft is sometimes to be stopped. Counter 180 begins to count, as soon as the driven shaft after start up has passed through the predetermined angular position. The output signal of counter 180 is converted by converter 181 into a staircase voltage whose elevation corresponds to the momentary count. If the command level 101 is moved to a setting commanding that the driven shaft be stopped at the predetermined angular position, the staircase voltage becomes applied to the servo amplifier 79, serving as the desired-value or command signal therefor until the time of generation of the next position signal indicating the predetermined angular position, the value of the staircase voltage for the zero-count of counter 180 corresponding to the desired-RPM command value for the preselected shutoff speed, e.g., 180 RPM.

This latter expedient has the advantage that, when arresting of the driven shaft at the predetermined angular position is commanded, the rate at which the speed of the driven shaft decreases from its current operating value down to 180 RPM is made only so great as actually necessary to reach 180 RPM within the time interval remaining before the predetermined angular position is actually reached. I.e., if arresting of the shaft is commanded just after the shaft has passed through the predetermined angular position, then the time remaining until this position is again reached is maximum, and the deceleration needed to bring the shaft speed down to 180 RPM before this position is again reached can be relatively low; in contrast, if stopping is commanded shortly before the shaft is about to reach the predetermined angular position, then the deceleration which brings the shaft speed down to 180 RPM before this position is reached will be relatively intense.

The value of the staircase voltage, constituting the RPM-command signal for an arresting operation, will correspond to a speed close to 180 RPM if arresting is commanded at a moment when the driven shaft is already closely nearing the predetermined angular position; the value of the staircase voltage will correspond to a higher speed if arresting is commanded at a moment when the driven shaft has just passed the predetermined angular position and the staircase voltage will then progressively change toward a value corresponding to 180 RPM as the predetermined angular position is neared. As a result, in general, the braking action involved in an arresting operation will be much softer than otherwise.

The illustrated circuit embodiment is designed to be readily implemented using MOS components. This makes possible a rather simple connecting together of linear amplifiers, comparators and power-amplifier end stages.

It will be understood that each of the elements described above, or two or more together, may also find a useful application in other types of circuits and constructions differing from the types described above.

While the invention has been illustrated and described as embodied in a system having particular operational capabilities, it is not intended to be limited to the details shown, since various modifications and structural changes may be made without departing in any way from the spirit of the present invention.

Without further analysis, the foregoing will so fully reveal the gist of the present invention that others can, by applying current knowledged, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A positioning system comprising, in combination, a drive motor having a drive member; an output shaft and means mounting the output shaft for rotation; an electromagnetically activatable clutch operative when activated for coupling the output shaft to the drive member, the clutch including a movable coupling structure movable between a first position coupling the output shaft to the drive member and a second position in which the output shaft and output shaft are not coupled; an electromagnetically activatable brake operative when activated for braking the output shaft, the brake including a movable braking structure movable between a first position applying braking force to the output shaft and a second position not applying braking force to the output shaft; negative-feedback speed control means including command transducer means generating a desired-speed signal, feedback transducer means generating a actual-speed signal and activating means operative in dependence upon the speed error indicated by the desired- and actual-speed signals for activating the clutch and the brake by applying thereto pulse-width-modulated actuating signals; and positioning means including means generating a position signal indicating when the output shaft has reached a predetermined angular position and means operative when activated for responding to the position signal and stopping the output shaft by activating the brake, further including roller-bearing means mounting the movable coupling structure of the clutch and the movable braking structure of the brake independently of each other on the output shaft non-rotatable relative to the output shaft but axially shiftable relative to the output shaft with a low-friction roller-bearing action, furthermore including a guide body mounted on the output shaft non-rotatable relative thereto, the guide body having a ring-like succession of angularly spaced axially extending openings encircling the output shaft, the roller-bearing means comprising a plurality of roller-bearing connectors each located in one of said openings, circumferentially successive ones of the roller-bearing connectors being alternately connected to the movable coupling structure of the clutch and to the movable braking structure of the brake, respectively, each roller-bearing connector comprising a guide sleeve coupled to a respective one of the movable braking structure of the brake and the movable coupling structure of the clutch, and a ball-bearing sleeve surrounding the guide sleeve and positioning for free rotation a plurality of spherical bearings, the negative-feedback speed control means including a monostable circuit connected to the output of the feedback transducer means and a timing capacitor connected to the monostable circuit, the monostable circuit controlling the charging of the timing capacitor, and furthermore including means for changing the discharge time of the timing capacitor in dependence upon the commanded speed, the feedback transducer means comprising means for generating pulses at a rate proportional to the rotary speed of the output shaft and frequency-multiplying means receiving the pulses and producing pulses of a higher frequency likewise proportional to the rotary speed of the output shaft, the frequency-multiplying means comprising a monostable circuit which produces an output pulse in response to the leading flank of an input pulse and also an output pulse in response to the trailing flank of an input pulse, the positioning signal being a positioning pulse, the positioning means comprising means for commanding that the output shaft be arrested at the predetermined angular position, means operative in response thereto for detecting the leading flank of the positioning pulse and automatically changing the commanded rotary speed for the output shaft to a lower shut-off value, and means responsive to the trailing flank of the positioning pulse for triggering the arresting of the output shaft.

2. The system defined in claim 1, the movable coupling structure and the movable braking structure each comprising a light-metal carrier plate provided with a friction layer and a plurality of magnetic pole pieces, the clutch and the brake each comprising a respective electromagnet operative when energized for moving the respective movable structure to the first position thereof.

3. The system defined in claim 2, the carrier plate and pole pieces of at least one of the movable structures comprising a plurality of discrete arcuate pole pieces cast on the carrier plate along the periphery of the latter.

4. The system defined in claim 2, the friction layer of each carrier disk extending axially only slightly beyond the magnetic pole pieces of the respective carrier disk.

5. The system defined in claim 2, the friction layers being extremely thin layers made of cork and one or more materials selected from the group consisting of paraffin, organic lubricants and inorganic lubricants.

6. The system defined in claim 2, the clutch and brake comprising means forming cooling-air channels which surround on all sides the carrier plates of the clutch and brake.

7. The system defined in claim 1, at least one of said command transducer means, said feedback transducer means and said position-signal-generating means comprising a control disk having a plurality of angularly spaced markings, and optoelectronic means operative for sensing the markings.

8. The system defined in claim 1, the positioning means comprising means generating an auxiliary desired-speed command signal whose value is a function of the angular position of the output shaft and which decreases to a predetermined shut-off value as the output shaft nears the predetermined angular position, and means operative when arresting of the output shaft at the predetermined angular position is commanded for automatically applying the auxiliary desired-speed command signal to the negative-feedback control means.

9. The system defined in claim 8, the means generating the auxiliary desired-speed command signal comprising counter means receiving pulses from the feedback transducer means, digital-to-analog converter means converting the count on the counter means into a staircase voltage constituting the auxiliary desired-speed command signal and having a value corresponding to the predetermined shut-off value when the count on the counter means is zero, and means for resetting the counter to zero when the output shaft reaches the predetermined angular position.

10. The system defined in claim 1, the circuitry of the negative-feedback speed control means being comprised of MOS components.

11. A positioning system comprising, in combination, a drive motor having a drive member; an output shaft and means mounting the output shaft for rotation; an electromagnetically activatable clutch operative when activated for coupling the output shaft to the drive member, the clutch including a movable coupling structure movable between a first position coupling the output shaft to the drive member and a second position in which the output shaft and drive member are not coupled; an electromagnetically activatable brake operative when activated for braking the output shaft, the brake including a movable braking structure movable between a first position applying braking force to the output shaft and a second position not applying braking force to the output shaft; negative-feedback speed control means including command transducer means generating a desired-speed signal, feedback transducer means generating a actual-speed signal and activating means operative in dependence upon the speed error indicated by the desired-and actual-speed signals for activating the clutch and the brake by applying thereto pulse-width-modulated actuating signals; and positioning means including means generating a position signal indicating when the output shaft has reached a predetermined angular position and means operative when activated for responding to the position signal and stopping the output shaft by activating the brake, further including roller-bearing means mounting the movable coupling structure of the clutch and the movable braking structure of the brake independently of each other on the output shaft non-rotatable relative to the output shaft but axially shiftable relative to the output shaft with a low-friction roller-bearing action, the output shaft being provided on its outer peripheral surface with a ring-like succession of angularly spaced axially extending generally semi-cylindrical grooves encircling the output shaft, the movable coupling structure of the clutch and the movable braking structure of the brake each having a central opening the periphery of which is provided with a corresponding plurality of correspondingly spaced generally semi-cylindrical grooves, the movable coupling structure and the movable brake structure each being mounted on the output shaft with the grooves of the output shaft in register with those of the respective movable structure, and furthermore including a plurality of spherical bearings confined within the space defined by each pair of registering semi-cylindrical grooves, the negative-feedback speed control means including a monostable circuit connected to the output of the feedback transducer means and a timing capacitor connected to the monostable circuit, the monostable circuit controlling the charging of the timing capacitor, and furthermore including means for changing the discharge time of the timing capacitor in dependence upon the commanded speed, the feedback transducer means comprising means for generating pulses at a rate proportional to the rotary speed of the output shaft, and frequency-multiplying means receiving the pulses and producing pulses of a higher frequency likewise proportional to the rotary speed of the output shaft, the frequency-multiplying means comprising a monostable circuit which produces an output pulse in response to the leading flank of an input pulse and also an output pulse in response to the trailing flank of an input pulse, the positioning signal being a positioning pulse, the positioning means comprising means for commanding that the output shaft be arrested at the predetermined angular position, means operative in response thereto for detecting the leading flank of the positioning pulse and automatically changing the commanded rotary speed for the output shaft to a lower shut-off value, and means responsive to the trailing flank of the positioning pulse for triggering the arresting of the output shaft.

12. The system defined in claim 11, the movable coupling structure and the movable braking structure each comprising a light-metal carrier plate provided with a friction layer and a plurality of magnetic pole pieces, the clutch and the brake each comprising a respective electromagnet operative when energized for moving the respective movable structure to the first position thereof.

13. The system defined in claim 12, the carrier plate and pole pieces of at least one of the movable structures comprising a plurality of discrete arcuate pole pieces cast on the carrier plate along the periphery of the latter.

14. The system defined in claim 12, the friction layer of each carrier disk extending axially only slightly beyond the magnetic pole pieces of the respective carrier disk.

15. The system defined in claim 12, the friction layers being extremely thin layers made of cork and one or more materials selected from the group consisting of paraffin, organic lubricants and inorganic lubricants.

16. The system defined in claim 12, the clutch and brake comprising means forming cooling-air channels which surround on all sides the carrier plates of the clutch and brake.

17. The system defined in claim 11, at least one of said command transducer means, said feedback transducer means and said position-signal-generating means comprising a control disk having a plurality of angularly spaced markings, and optoelectronic means operative for sensing the markings.

18. The system defined in claim 11, the positioning means comprising means generating an auxiliary desired-speed command signal whose value is a function of the angular position of the output shaft and which decreases to a predetermined shut-off value as the output shaft nears the predetermined angular position, and means operative when arresting of the output shaft at the predetermined angular position is commanded for automatically applying the auxiliary desired-speed command signal to the negative-feedback control means.

19. The system defined in claim 18, the means generating the auxiliary desired-speed command signal comprising counter means receiving pulses from the feedback transducer means, digital-to-analog converter means converting the count on the counter means into a staircase voltage constituting the auxiliary desired-speed command signal and having a value corresponding to the predetermined shut-off value when the count on the counter means is zero, and means for resetting the counter to zero when the output shaft reaches the predetermined angular position.

20. The system defined in claim 11, the circuitry of the negative feedback speed control means being comprised of MOS components.

21. A positioning system comprising, in combination, a drive motor having a drive member; an output shaft and means mounting the output shaft for rotation; an electromagnetically activatable clutch operative when activated for coupling the output shaft to the drive member, the clutch incuding a movable coupling structure movable between a first position coupling the output shaft to the drive member and a second position in which the output shaft and drive member are not coupled; an electromagnetically activatable brake operative when activated for braking the output shaft, the brake including a movable braking structure movable between a first position applying braking force to the output shaft and a second position not applying braking force to the output shaft; negative-feedback speed control means including command transducer means generating a desired-speed signal, feedback transducer means generating an actual-speed signal, activating means operative in dependence upon the speed error indicated by the desired- and actual-speed signals for activating the clutch and the brake by applying thereto pulse-width-modulated actuating signals and including a monostable circuit connected to the output of the feedback transducer means and a timing capacitor connected to the monostable circuit, the monostable circuit controlling the charging of the timing capacitor, and furthermore including means for changing the discharge time of the timing capacitor in dependence upon the commanded speed; and positioning means including means generating a position signal indicating when the output shaft has reached a predetermined angular position and means operative when activated for responding to the position signal and stopping the output shaft by activating the brake.

* * * * *